(12) United States Patent
Gu et al.

(10) Patent No.: US 12,372,767 B2
(45) Date of Patent: Jul. 29, 2025

(54) PHOTONIC CRYSTAL MICROSCOPE AND METHOD OF MEASURING CELLULAR FORCES

(71) Applicant: INSTITUTE OF MEDICAL DEVICES (SUZHOU), SOUTHEAST UNIVERSITY, Jiangsu (CN)

(72) Inventors: Zhongze Gu, Jiangsu (CN); Qiwei Li, Jiangsu (CN); Zaozao Chen, Jiangsu (CN)

(73) Assignee: INSTITUTE OF MEDICAL DEVICES (SUZHOU), SOUTHEAST UNIVERSITY, Suzhou (CN)

( * ) Notice: Subject to any disclaimer, the term of this patent is extended or adjusted under 35 U.S.C. 154(b) by 388 days.

(21) Appl. No.: 18/180,120

(22) Filed: Mar. 7, 2023

(65) Prior Publication Data

US 2023/0221538 A1    Jul. 13, 2023

Related U.S. Application Data

(63) Continuation of application No. PCT/CN2020/137819, filed on Dec. 19, 2020.

(30) Foreign Application Priority Data

Sep. 8, 2020   (CN) .......................... 202010931803.4

(51) Int. Cl.
  *G02B 21/00*   (2006.01)
  *G02B 1/00*    (2006.01)
  *G02B 26/00*   (2006.01)

(52) U.S. Cl.
  CPC ......... *G02B 21/0076* (2013.01); *G02B 1/005* (2013.01); *G02B 26/007* (2013.01)

(58) Field of Classification Search
  CPC .. G02B 21/0076; G02B 1/005; G02B 26/007; G02B 1/00; G02B 1/002; G02B 1/04;
  (Continued)

(56) References Cited

U.S. PATENT DOCUMENTS

2011/0222142 A1*  9/2011  Arsenault ............. G02B 1/005
                                                       359/297

FOREIGN PATENT DOCUMENTS

CN   102533537 A     7/2012
CN   107941678 A  *  4/2018 ............. G01N 15/10
(Continued)

*Primary Examiner* — Arnel C Lavarias (57) ABSTRACT

Disclosed are a photonic crystal microscope and a method of measuring cellular forces. The photonic crystal substrate includes a photonic crystal substrate, a stage, a probe light source, and an imaging assembly, the photonic crystal substrate being disposed above the stage, the probe light source and the imaging assembly being sequentially disposed at a side of the stage opposite the photonic crystal substrate, the photonic crystal substrate being configured to culture a to-be-measured cell, the photonic crystal substrate being deformable when the to-be-measured cell grows on the photonic crystal substrate; the probe light source is configured to emit probe light to the photonic crystal substrate; the photonic crystal substrate is configured to reflect the probe light to the imaging assembly; the imaging assembly is configured to receive the light reflected from the photonic crystal substrate to perform imaging.

17 Claims, 4 Drawing Sheets

(58) Field of Classification Search
CPC ............... G02B 21/00; G02B 21/0004; G02B 21/0032; G02B 21/0052; G02B 21/06; G02B 21/26; G02B 21/34; G02B 21/36; G02B 21/361
USPC ........ 359/368, 362, 363, 369, 385, 391, 396
See application file for complete search history.

(56) References Cited

FOREIGN PATENT DOCUMENTS

| | | |
|---|---|---|
| CN | 109827928 A | 5/2019 |
| WO | WO-2020155324 A1 * | 8/2020 |
| WO | WO-2020155716 A1 * | 8/2020 |

* cited by examiner

PHOTONIC CRYSTAL MICROSCOPE AND METHOD OF MEASURING CELLULAR FORCES

CROSS-REFERENCE TO RELATED APPLICATIONS

The present application is a Continuation Application of PCT Application No. PCT/CN2020/137819 filed on Dec. 19, 2020, which claims the benefit of Chinese Patent Application No. 202010931803.4 filed on Sep. 8, 2020. All the above are hereby incorporated by reference.

FIELD

Embodiments of the present disclosure relate to crystal microscopes, and more particularly relate to a photonic crystal microscope and a method for measuring cellular forces.

BACKGROUND

Forces generated by cells are critical regulators of cell adhesion, signaling, and function, and they are also essential drivers in the morphogenetic events of development. Over the past decades, several methods have been developed to measure these forces. However, despite recent substantial interest in understanding the contribution of these forces in biology, implementation and adoption of the developed methods by the broader biological community remain challenging.

The simplest methods for characterizing the presence of cellular forces involve measuring deformations of cells, substrates, or tissues without attempting to relate those deformations to an actual force. For example, cells embedded in collagen gels will compact the gel, likely mimicking the contractions that occur during wound closure. Magnitude of a cellular force is preliminary determined by the change in diameter of a cell-laden gel polymerized in a well. The advantage of this method is that it does not require a complex theory or measurement approach to perform a complex calculation to convert deformation to force with respect to the mechanical deformation of a material being deformed. However, deformation-based methods also have drawbacks. Implicit in the analysis is the assumption that more compaction or retraction means more cellular force, but fracture, plasticity, and viscoelasticity of the material may invalidate this assumption. In addition, the mechanical properties of living materials can change actively in response to perturbation, causing the tissue to undergo more or less compaction under constant force. Further, time scales of these deformation assays do not allow measurement of force fluctuations, which are particularly important in the study of fast-contracting cells such as myocytes. Further approaches have been used to measure the forces generated in compacting hydrogels. The first approach is to use a gel that is large enough to be attached to an external isometric force sensor. These sensors are off-the-shelf devices that change resistance or voltage signals with force. Therefore, force, as opposed to displacement, is measured directly from the contractile tissue. Such systems have been used to measure the forces generated by cells from highly contractile tissues, including skin fibroblasts, cardiac myocytes, and skeletal myocytes. Though these systems provide continuous and long-term measurement of tissue contractile forces, the signal processing required to convert the electrical signal output from the force sensor to the actual force might be beyond the expertise of a standard biological laboratory. Furthermore, these methods are limited in throughput because the lower bound of the sensor's operating range is typically in micro- to millinewtons, requiring the use of large tissues that need to be manually mounted to the force sensor.

The second approach is to incorporate cantilevers of known stiffness into the system, so that as the tissue contracts, the cantilevers bend. The displacement of the free end of a cantilever can be imaged with optical microscopy, and the observed displacements can be used to calculate the tissue contractile forces using beam theory. An advantage of this system is that the deformation of many cantilevers can be measured simultaneously. The system also can be made much smaller than the electronic assays mentioned above, which means they require fewer cells and less extracellular matrix (ECM) material, and they do not require manual mounting of tissues to individual sensors. More recently, vertical cantilevers have been microfabricated from silicone elastomer), enabling the creation of systems that can measure forces from constructs with as few as 100-600 cells. These systems have become an increasingly important tool for measuring forces in cells such as cardiomyocytes. Though measuring forces using these microfabricated constructs requires little more than a microscope with a suitably long working distance, fabrication of the systems requires techniques that are not standard in biological laboratories. The cantilevers are fabricated by soft lithography. However, microfabrication facilities are required for the creation of the original silicon master; although foundries will fabricate silicon masters for a cost, the technical designs needed to specify the production process involve substantial expertise. Measuring the net contractile forces generated by tissue constructs can provide quantitative information about the signals that drive tissue deformation, in particular the role of the ECM. However, ECM remodeling and cellular forces are coupled in the resulting aggregate measurement, which therefore depends on the specific formulation used for generating the cell-laden ECM gels. These factors make it difficult both to compare measurements across different studies and to isolate the forces generated by individual cells.

Cellular traction force microscopy (TFM) involves tracking the deformations of synthetic elastic polymer substrates that result from the exertion of cellular force. This method, and its variations, remains the most widely used technique for measuring cellular force. In standard TFM, small ($\leq 1$ $\mu$m) fluorescent beads are mixed into silicone or polyacrylamide (PA) substrates to serve as fiduciary markers that can be tracked in space and time with optical microscopy. A typical TFM experiment involves the following: optically imaging the distribution of beads in a stressed state; releasing cell tractions via cell lysis, detachment, or myosin inhibition; and then imaging the fluorescent beads again to determine their positions in the unstressed state. Computational algorithms are used to analyze the resulting two images (or sequence of images) to determine the displacement of the beads caused by the cells and the forces required to cause such displacement. Because the beads are much smaller than the size of a cell. TFM allows cellular forces to be mapped with subcellular resolution. Such measurements have enabled characterization of the force dynamics involved in a variety of cell biological processes such as adhesion maturation, migration, differentiation, and malignant transformation. The computational analysis required to calculate microparticle displacements and forces has been a significant hurdle for laboratories looking to implement TFM, as the calculations are complex, nuanced, and difficult to validate. This is because small errors in measuring the bead location can contribute large errors to force calculations and mathematical ill-posedness. The size and spacing of the fiduciary markers and the optical resolution of the microscope determine the spatial resolution of the observed deformation field and, in turn, the spatial resolution of the computed traction field. Thus, mapping tractions with high resolution requires high-resolution imaging, which prevents broad uptake of the method. The high-power objective lens required by high resolution also limits the flux. In addition, high toxicity also causes a large noise to the sample under measurement itself.

Although the micropillar array-based methods and the fluorescence resonance energy transfer (FRET)-based methods have been developed substantially, they still face limitations such as difficulty in fabrication and demanding on measurement gauges. In addition, existing methods are only limited to measurement of forces generated by macro-tissues or a small number of cells in microenvironments, unable to perform force measurement with a subcellular resolution within the field of view of millimeters.

SUMMARY

To solve at least one of the above and other drawbacks in conventional technologies, the present disclosure provided a photonic crystal microscope and a method of measuring cellular forces.

In one aspect of the disclosure, there is provided a photonic crystal microscope, comprising: a photonic crystal substrate, a stage, a probe light source, and an imaging assembly, the photonic crystal substrate being disposed above the stage, the probe light source and the imaging assembly being sequentially disposed at a side of the stage opposite the photonic crystal substrate, the photonic crystal substrate being configured to culture a to-be-measured cell, the photonic crystal substrate being deformable when the to-be-measured cell grows on the photonic crystal substrate, wherein, the probe light source is configured to emit probe light to the photonic crystal substrate;

the photonic crystal substrate is configured to reflect the probe light to the imaging assembly;

the imaging assembly is configured to receive the light reflected from the photonic crystal substrate to perform imaging, whereby force information between the to-be-measured cell and the photonic crystal substrate is obtained via a resultant image.

In some optional embodiments, the photonic crystal substrate comprises: a light-transmissive support layer;

a photonic crystal membrane disposed at a side of the support layer opposite the stage.

In some optional embodiments, the photonic crystal membrane has a reflectivity greater than 35% at best reflective band within a band range from 430 nm to 700 nm, and a light transmittance greater than 70% in a non-bandgap range.

In some optional embodiments, the photonic crystal membrane has a thickness ranging from 20 μm to 80 μm.

In some optional embodiments, the photonic crystal membrane has a Young's modulus ranging from 0.5 kPa to 100 kPa.

In some optional embodiments, the photonic crystal membrane has a photonic bandgap range from 430 nm to 700 nm.

In some optional embodiments, the photonic crystal microscope further comprises an objective lens disposed between the stage and the probe light source.

In some optional embodiments, the objective lens has a numerical aperture ranging from 0.1 to 0.9, and/or a magnification power ranging from 1× to 100×.

In some optional embodiments, the imaging assembly comprises an optical filter and a photosensitive element, a path where the optical filter lies is located between the photosensitive element and the stage.

In another aspect of the present disclosure, there is provided a method for measuring cellular forces, which uses the photonic crystal microscope described above, the method comprising:

placing the photonic crystal substrate on the stage to observe deformation of the photonic crystal substrate under an action of a to-be-measured cell;

emitting, by the probe light source, probe light to the photonic crystal substrate;

receiving, by the imaging assembly, the light reflected from the photonic crystal substrate to perform imaging, whereby force information between the to-be-measured cell and the photonic crystal substrate is obtained via a resultant image.

The photonic crystal microscope and the method of measuring cellular forces according to the embodiments of the present disclosure provide a method for quantitatively measuring the cellular biomechanics using a photonic crystal substrate, which realizes significant increase of flux while ensuring subcellular measurement precision by imaging the light reflected from the photonic crystal substrate and calculating the mechanical interaction information between the cell and the substrate with a mathematic algorithm. In addition, compared with the currently commonly used cellular TFM technology, the optical properties of photonic crystal, which are different from stochastically distributed fluorescent beads, offer a constant, known initial state during the measurement process, which significantly simplifies algorithm complexity, reduces sensitivity to noise, and mitigates experiment complexity. Furthermore, compared with micropillar array techniques, homogeneity of the photonic crystal substrate renders a much less interference with the physiological activities of the cell itself than discrete micropillar arrays, allowing for more accurate reproduction of the physiological environment to obtain a more accurate result. Finally, the microscope according to the embodiments of the present disclosure significantly mitigates phototoxic impact on the cell sample, because during measuring the biomechanical information, the mechanical information is implied in the reflected light whose luminance is far higher than fluorescence.

DETAILED DESCRIPTION

To facilitate those skilled in the art to understand the technical solution of the present disclosure, the present disclosure will be described in more details below through specific implementations with reference to the accompanying drawings.

Figure 1:
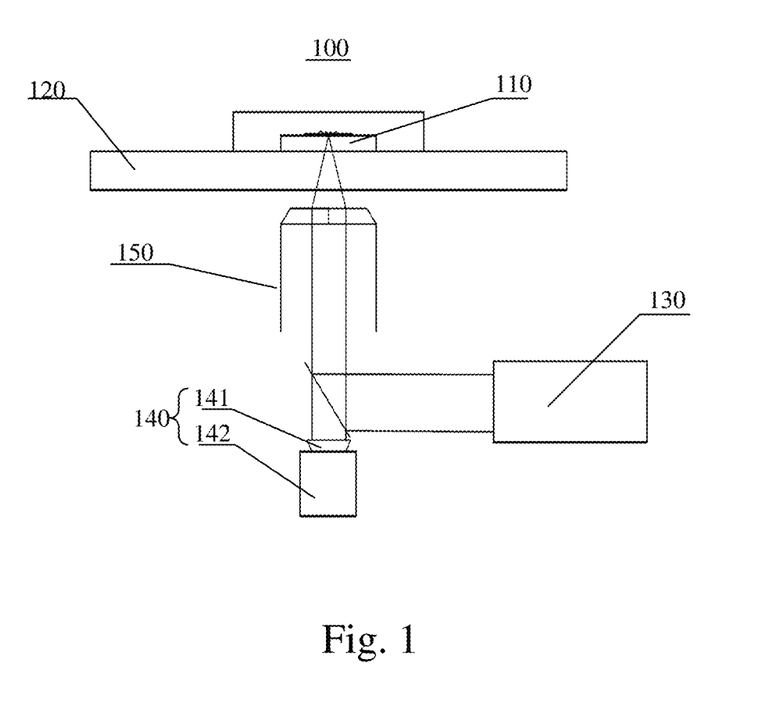
FIG. 1 shows a structural schematic diagram of a photonic crystal microscope according to one embodiment of the present disclosure.

FIG. 1 illustrates a photonic crystal microscope 100. The photonic crystal microscope 100 comprises a photonic crystal substrate 110, a stage 120, a probe light source 130, and an imaging assembly 140.

In an example embodiment, as illustrated in FIG. 1, the photonic crystal substrate 110 is disposed on the stage 120; the photonic crystal substrate 110 is configured to culture a to-be-measured cell (not shown); and when the to-be-measured cell is grown on the photonic crystal substrate 110, the photonic crystal substrate 110 is deformed in the area where the cell grows, which means besides culturing a to-be-measured cell, the photonic crystal substrate 110 comprised in the photonic crystal microscope 100 further serves as a sensor for measuring a cellular traction force.

In an example embodiment, as illustrated in FIG. 1, the probe light source 130 and the imaging assembly 140 are sequentially disposed at a side of the stage 120 opposite the photonic crystal substrate 110, i.e., the probe light source 130 is disposed between the stage 120 and the imaging assembly 140. The probe light source 130 is configured to emit a probe light to the photonic crystal substrate 110 for measuring mechanical information of a to-be-measured cell. The photonic crystal substrate 110 is further configured to reflect the probe light to the imaging assembly 140. The imaging assembly 140 is configured to receive the light reflected from the photonic crystal substrate 110 to perform imaging, whereby information about the force between the to-be-measured cell and the photonic crystal substrate is obtained via the resultant image.

Figure 2:
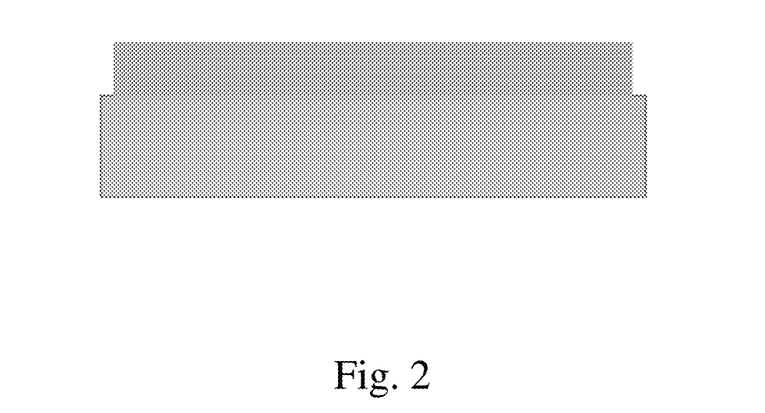
FIG. 2 shows a schematic diagram of action of light reflected from a photonic crystal membrane not subjected to a cellular traction force according to another embodiment of the present disclosure.
Figure 3:
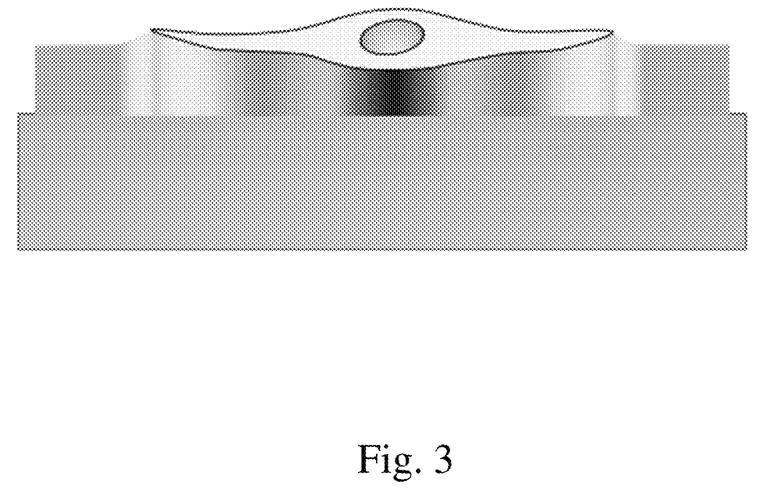
FIG. 3 shows a schematic diagram of action of light reflected from a photonic crystal membrane subjected to a cellular traction force according to a further embodiment of the present disclosure.

Specifically, as illustrated in FIG. 1, the photonic crystal substrate 110 is deformed after the to-be-measured cell is cultured on the photonic crystal substrate 110; in this way, after receiving the probe light emitted from the probe light source 130, the deformed photonic crystal substrate 110 may cause change to a photonic bandgap, which may in turn change the wavelength component of the reflected light, as illustrated in FIG. 3. As such, the imaging assembly 140 receives the reflected light and performs imaging to obtain mechanical interaction information between the to-be-measured cell and the photonic crystal substrate 110 via the resultant image. For example, the mechanical interaction information between the to-be-measured cell and the photonic crystal substrate may be calculated with a mathematic algorithm after inputting the image into a terminal device such as a computer which then performs analysis and extraction with respect to the image. In contrast, if the to-be-measured cell is not disposed on the photonic crystal substrate 110, as illustrated in FIG. 1 and FIG. 2, the wavelength component of the reflection light of the photonic crystal substrate 110 does not change.

The photonic crystal microscope according to the embodiments of the present disclosure provides a method for quantitatively measuring the cellular biomechanics using a photonic crystal substrate, which realizes significant increase of flux while ensuring subcellular measurement precision by imaging the light reflected from the photonic crystal substrate and calculating the mechanical interaction information between the cell and the substrate with a mathematic algorithm. In addition, compared with the currently commonly used cellular TFM technology, the optical properties of photonic crystal, which are different from stochastically distributed fluorescent beads, offer a constant, known initial state during the measurement process, which significantly simplifies algorithm complexity, reduces sensitivity to noise, and mitigates experiment complexity. Furthermore, compared with micropillar array techniques, homogeneity of the photonic crystal substrate renders a much less interference with the physiological activities of the cell itself than discrete micropillar arrays, allowing for more accurate reproduction of the physiological environment to obtain a more accurate result. Finally, the microscope according to the embodiments of the present disclosure significantly mitigates phototoxic impact on the cell sample, because during measuring the biomechanical information, the mechanical information is implied in the reflected light whose luminance is far higher than fluorescence, whereby the need of additionally increasing the intensity of the light source is obviated.

In an example embodiment, the photonic crystal substrate 110 comprises a support layer and a photonic crystal membrane. The support layer is light-transmissive and disposed on the stage 120. The photonic crystal membrane is disposed at a side of the support layer opposite the stage 120.

The photonic crystal microscope according to the embodiments of the present disclosure offers a known initial state of a composite material of the photonic crystal membrane serving as a sensing unit, which obviates the need to construct a correspondence relationship, whereby the measuring process may be simplified.

In an example embodiment, the photonic crystal membrane has a reflectivity greater than 35% at the best reflective band within a band ranging from 430 nm to 700 nm, and a light transmittance greater than 70% in a non-bandgap range. The photonic crystal membrane has a thickness ranging from 20 μm to 80 μm. The photonic crystal membrane has a Young's modulus ranging from 0.5 kPa to 100 kPa. The photonic crystal membrane has a photonic bandgap ranging from 430 nm to 700 nm. Of course, besides the ranges set forth herein, those skilled in the art may also select other value ranges dependent on actual needs, which are not limited in the embodiments of the present disclosure.

In an example embodiment, as illustrated in FIG. 1, the photonic crystal microscope 100 further comprises an objective lens 150 disposed between the stage 120 and the probe light source 130. The objective lens 150 has a numerical aperture ranging from 0.1 to 0.9 and a magnification power ranging from 1× to 100×. Of course, besides the values set forth herein, the objective lens 150 may select other values for numerical aperture and magnification power, which are not limited in the embodiments of the present disclosure.

In an example embodiment, as illustrated in FIG. 1, the imaging assembly 140 comprises an optical filter 141 and a photosensitive element 142, the optical path where the optical filter 141 lies being located between the photosensitive element 142 and the stage 120.

Hereinafter, an implementation principle of the photonic crystal microscope according to the embodiments of the present disclosure will be described in more details:

As illustrated in FIG. 1, the photonic crystal microscope 100 provided according to the embodiments of the present disclosure enables acquisition of mechanical modal information. After a to-be-measured cell is placed and cultured on the photonic crystal substrate 110 of the photonic crystal microscope 100 in the embodiments of the present disclosure, the photonic crystal membrane is deformed under the stress imposed by the cell, which changes the photonic bandgap at a corresponding position of the photonic crystal membrane, leading to change of the reflection spectrum of the photonic crystal. Furthermore, by reproducing the membrane strain using a mathematic algorithm and based on the inherent mechanic and geometric properties of the material, the magnitude of cell-induced deformation and stress of the substrate perpendicular to the initial state may be obtained. In the embodiments of the present disclosure, the cell traction force is measured in such a way: since the cell-induced photonic crystal substrate deformation information is implied in the reflected light, by acquiring the reflected light to image and extracting the interactive force information between the cell and the photonic crystal material from the image using an algorithm, the cell-induced strain, stress, and deformation of the photonic crystal material are obtained in real time, which may achieve a very high flux and accuracy.

Existing cellular traction force microscopes generally have two use modes, both of which intend to address the correspondence relationship of the beads between the measured point state and the initial unstressed state. In the first mode, before the cell is adhered to the wall, an area of interest is repetitively imaged till end of the assay, to determine a bead displacement trajectory reflecting change of local stress. If the field of view is left and then resumed, the correspondence relationship between the beads under the current field of view and the beads in the initial state likely cannot be inferred and thus the stress distribution cannot be obtained. In the second mode, after the current position of the beads are determined by fluorescently imaging the sample of interest, pancreatin is added to separate the cell from the substrate; imaging is performed continuously during this process to obtain a moving trajectory of the beads from the inhomogeneous stress distribution state to the unstressed state of the substrate, thereby obtaining the correspondence relationship of the beads between the two states. Apparently, in the first mode, it is hard to image a large number of samples using the same optical system; while in the second mode, since digestion of the pancreatin causes damages to the sample, it becomes impossible to repetitively measure the same sample of interest. However, assaying with the photonic crystal microscope provided according to the present disclosure does not have such limitations, because the initial state of the photonic crystal hydrogel membrane as the sensing unit is known, obviating the need of constructing the correspondence relationship.

To measure a high-speed changing sample, e.g., beating myocardium, the cellular traction force microscope requires a high-energy exciting light and a highly sensitive microscope camera to obtain a high enough temporal resolution due to weak fluorescence of the fluorescent beads, which likely impairs the sample and is also demanding on experiment hardware. However, since the mechanical information is implied in the reflection spectrum, the luminance of which is far higher than fluorescent light, the photonic crystal microscope according to the present disclosure obviates the need to additionally increase the intensity of light source, significantly mitigating phototoxic impact on the cell sample.

Another aspect of the present disclosure provides a method of measuring cellular forces using the photonic crystal microscope described above. The specific structure of the photonic crystal microscope may refer to the description above, which will not be detailed here. The method comprises:

disposing the photonic crystal substrate on the stage to observe deformation of the photonic crystal substrate under action of a to-be-measured cell;

emitting, by the probe light source, probe light to the photonic crystal substrate;

reflecting, by the photonic crystal substrate, the probe light to the imaging assembly;

receiving, by the imaging assembly, the light reflected from the photonic crystal substrate to perform imaging, whereby force information between the to-be-measured cell and the photonic crystal substrate is obtained via a resultant image.

The photonic crystal measuring method according to the embodiments of the present disclosure provides a method for quantitatively measuring cellular biomechanics using a photonic crystal substrate, which realizes significant increase of flux while ensuring subcellular measurement precision by imaging the light reflected from the photonic crystal substrate and calculating the mechanical interaction information between the cell and the substrate using a mathematic algorithm. In addition, compared with the currently commonly used TFM technology, the optical properties of photonic crystal, which are different from stochastically distributed fluorescent beads, offer a constant, known initial state during the measurement process, which significantly simplifies algorithm complexity, reduces sensitivity to noise, and mitigates experiment complexity. Furthermore, compared with micropillar array techniques, the homogeneous property of the photonic crystal substrate renders a much less interference with the physiological activities of the cell itself than discrete micropillar arrays, allowing for more accurate reproduction of the physiological environment to obtain a more accurate result. Finally, the microscope according to the embodiments of the present disclosure facilitates maintaining the original state of the biological sample, because during measuring the biomechanical information, the mechanical information is implied in the reflected light whose luminance is far higher than fluorescence, whereby the need of additionally increasing the intensity of the light source is obviated.

Specifically, in conjunction with FIG. 1, the photonic crystal substrate 110 may refer to a photonic crystal hydrogel formed by attaching polyacrylamide and silicon dioxide of about 30 μm onto the upper surface of a quartz sheet, in which the polyacrylamide photonic crystal hydrogel membrane has a Young's modulus of 3 kPa; the photonic crystal membrane has its center reflective wavelength at 550 nm, which achieves a broad measurement range; the peak width at half height of the reflection peak is 20 nm, the best reflective band has a reflectivity of 40%, and the non-bandgap range has a light transmissivity greater than 85%, whereby a high signal-to-noise ratio is achieved. After the amino on the surface of the photonic crystal hydrogel is activated using Sulfo-SANPAH, the photonic crystal hydrogel is rinsed three times using HEPES buffer and then soaked in a HEPES buffered 0.1 mg/mL Type 1 rat tail tendon collagen solution overnight at 4° C. for functional modification.

After having been soaked in the α-MEM culture medium overnight, the photonic crystal hydrogel membrane is removed into a cell culture dish, and then a 10% fetal bovine serum α-MEM culture medium is quickly added to immerse the photonic crystal hydrogel. A neonatal rat primary cardiomyocyte is added in the dispersive liquid in the 10% fetal bovine serum α-MEM culture medium and placed in a carbon dioxide incubator for culture. Three hours later, the sample is imaged.

The cultured sample together with the culture dish is placed at the center of the stage 120. A round hole is provided in the center of the stage 120. FIG. 3 shows an schematic diagram of the action of the light reflected from the photonic crystal membrane under the action of the cellular force, which illustrates that the photonic crystal membrane on the photonic crystal substrate 110 is deformed under the force imposed by the to-be-measured cell, leading to change of the reflection wavelength of the probe light. After the reflected light is collected by the imaging assembly, information about the mechanical interaction between the cell and the substrate is obtained using a mathematic algorithm. Growth of the cardiomyocyte imposes a force against the photonic crystal membrane, leading to deformation of the photonic crystal membrane. Reflection of the photonic crystal to light has a wavelength selectivity, i.e., the reflection spectrum corresponds to the photonic bandgap. Accordingly, at points where the cell imposes a pressing force to the photonic crystal membrane towards the substrate, blueshift occurs to the reflection spectrum; at points where the cell imposes a pull force away from the substrate, redshift occurs to the reflection spectrum, whereby a pattern is formed in the camera.

After the cell culture dish is removed out of the incubator and placed on the stage 120, the photonic crystal substrate 110 is placed on the stage 120 perpendicular to the main optical axis. In this way, the transmittance light and the reflection light may be better transmitted and reflected on the photonic crystal membrane, resulting in a better image quality. A 10× objective length with a numerical aperture of 0.45 is used; Z-axis is adjusted to focus on the polyacrylamide photonic crystal hydrogel membrane. The transmittance light source is turned off, and the to-be-measured area is captured using a microscope camera with a resolution of 4800*3600, whereby mechanical modal information is obtained. The fluorescent optical shutter is closed, i.e., cutting off the reflection light source. The transmittance light source is turned on, and the to-be-measured area is captured using a microscope camera with a resolution of 4800*3600 to obtain a common phase-difference modal information.

The mechanical modal image is preprocessed by median filtering. The median filtering template has a size of 5*5. Since the wavelength displacement percentage and the strain at the reflection light peak position of the photonic crystal are approximately linear, the color phases of respective pixels of the image may be converted to reflection peak position information based on the calibrated camera color-phase relationships, and then in combination with the initial peak position information, strains at corresponding positions may be obtained; and finally, strain distribution of the to-be-measured cell area is obtained based on the material's Young's modulus and the strains at respective points.

The method of obtaining the relationships between the color phases of the colored image captured by the camera and the peak positions of the reflected light of the photonic crystal specifically comprises: compacting the photonic crystal membrane using a nanometer-precision platen, recording simultaneously spectra and colored image data using the spectroscope and the camera, mapping the peak positions of spectra with the color phases of the image at same time points to obtain a mapping relationship between the reflection peak positions of the photonic crystal and the color phases.

Figure 4:
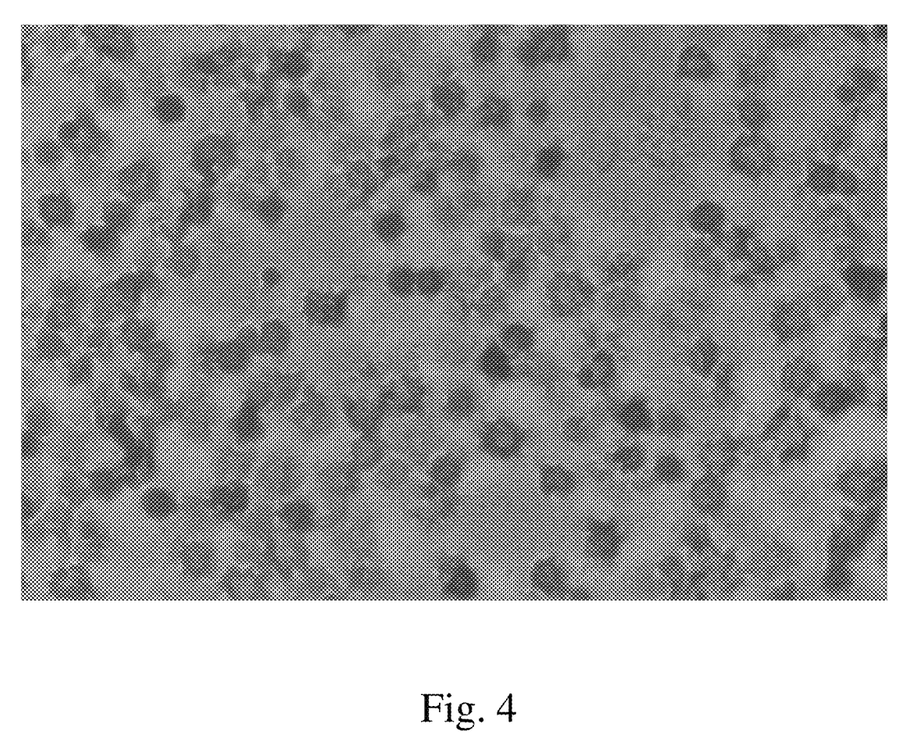
FIG. 4 shows a photonic crystal image under a 10× objective lens according to another embodiment of the present disclosure
Figure 5:
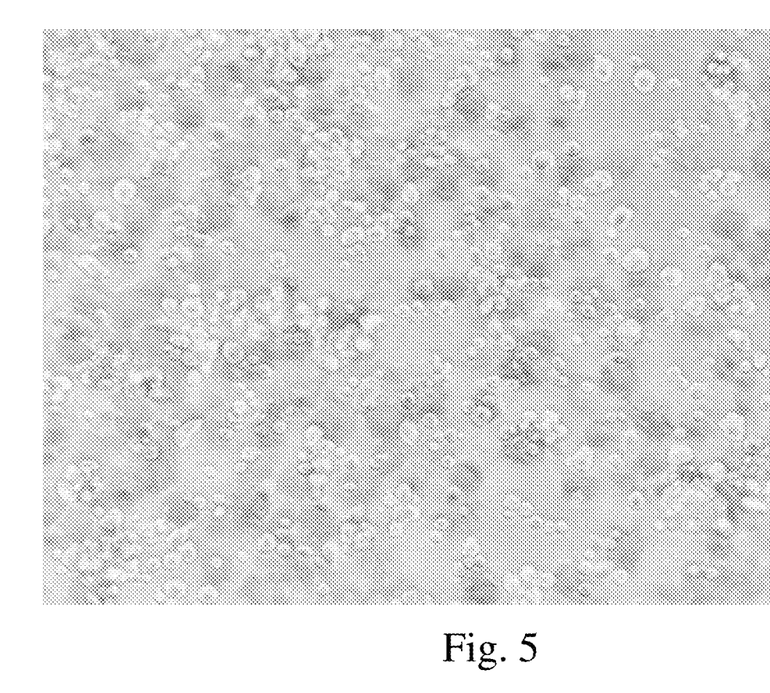
FIG. 5 shows a phase-difference modal image under a 10× objective lens according to another embodiment of the present disclosure.
Figure 6:
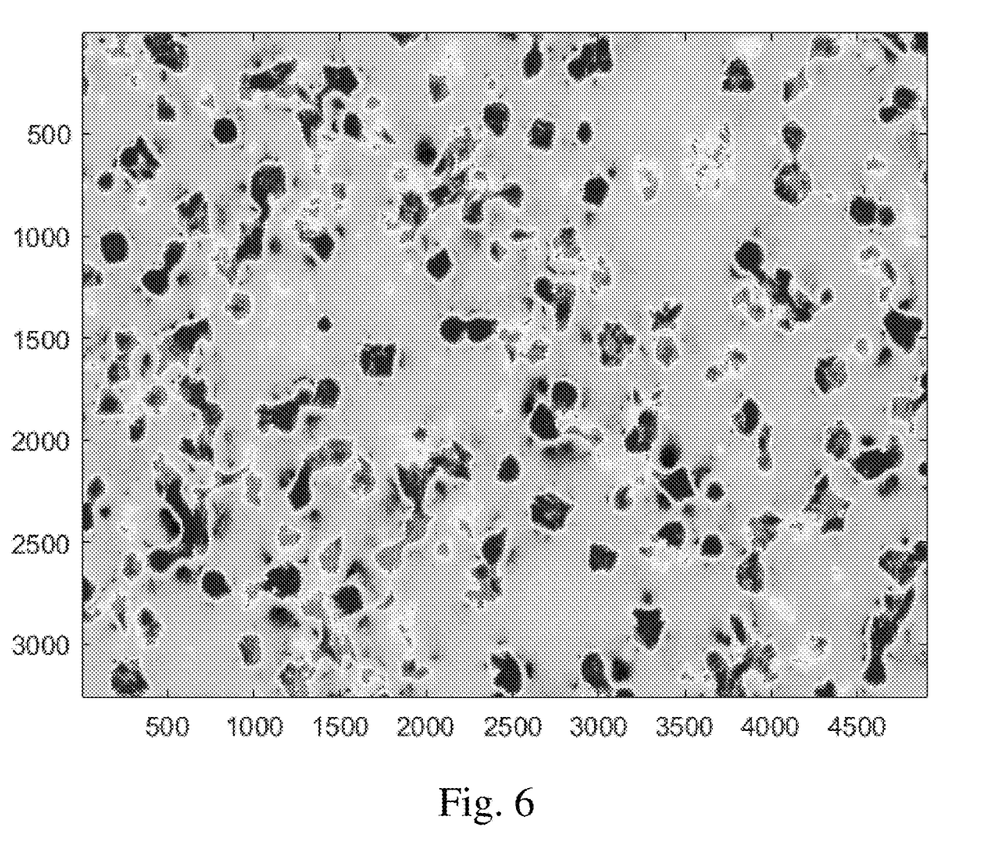
FIG. 6 shows a force heatmap under a 10× objective lens according to another embodiment of the present disclosure.

After the neonatal rat primary cardiomyocyte has been cultured on the polyacrylamide photonic crystal hydrogel membrane, a conventional phase difference image is obtained using a phase difference mode, and a mechanical modal map is obtained using a reflection mode; after the color phase information is extracted, strain information is obtained based on the mapping relationship between the color phases and the photonic bandgap peak positions. For example, FIG. 4, FIG. 5, and FIG. 6 illustrate a photonic crystal image directly captured, a phase different modal map, and a calculated stress heatmap, respectively. These images clearly reveal the local strain induced by interaction between the subcellular structure (e.g., platelet lamellipodia) and the substrate, and enables observation of multiple cells in a millimeter-order field of view, whereby a high-flux, high-precision measurement is realized.

It is understood that the embodiments described above are only example embodiments for illustrating the principle of the present disclosure; however, the present disclosure is not limited thereto. To those of normal skill in the art, various alterations and modifications may be made without departing from the spirit and substance of the present disclosure, and all such alterations and modifications are deemed to fall within the protection scope of the present disclosure.

We claim:

1. A photonic crystal microscope, comprising: a photonic crystal substrate, a stage, a probe light source, and an imaging assembly, the photonic crystal substrate being disposed above the stage, the probe light source and the imaging assembly being sequentially disposed at a side of the stage opposite the photonic crystal substrate, the photonic crystal substrate being configured to culture a to-be-measured cell; wherein, the probe light source is configured to emit probe light to the photonic crystal substrate;

the photonic crystal substrate is configured to reflect the probe light to the imaging assembly, wherein the photonic crystal substrate comprises a light-transmissive support layer and a photonic crystal membrane, the photonic crystal membrane being disposed at a side of the support layer opposite the stage, the photonic crystal membrane being disposed above the stage in a non-suspended manner, wherein when the to-be-measured cell grows on the photonic crystal membrane, the to-be-measured cell imposes a force against the photonic crystal membrane, leading to deformation of the photonic crystal membrane; the photonic crystal membrane disposed in a non-suspended manner has a wavelength selectivity with respect to light reflection such that the photonic crystal substrate deformed may vary a wavelength component of the light reflected, resulting in correspondence between a reflection spectrum and a photonic bandgap; at points where the to-be-measured cell imposes a pressing force to the photonic crystal membrane towards the substrate, blueshift occurs to the reflection spectrum, and at points where the to-be-measured cell imposes a pull force away from the substrate, redshift occurs to the reflection spectrum, whereby a pattern is formed in the imaging assembly;

the imaging assembly is configured to receive the light reflected from the photonic crystal substrate to perform imaging, whereby force information between the to-be-measured cell and the photonic crystal substrate is obtained via a resultant image;

the imaging assembly comprises a spectroscope and a camera, which is specifically configured to:
compact the photonic crystal membrane using a nanometer-precision platen, record simultaneously spectra and colored image data using the spectroscope and the camera, and map peak positions of spectra with color phases of the image at same time points to obtain a mapping relationship between reflection peak positions of the photonic crystal and the color phases; and
obtain a conventional phase-difference image according to a phase-difference mode, obtain a mechanical modal map using a reflection mode, followed by extracting color phase information, and obtain strain information based on mapping relationship between the color phases and photonic bandgap peak positions.

2. The photonic crystal microscope of claim 1, wherein the photonic crystal membrane has a reflectivity greater than 35% at best reflective band within a band range from 430 nm to 700 nm, and a light transmittance greater than 70% in a non-bandgap range.

3. The photonic crystal microscope of claim 1, wherein the photonic crystal membrane has a thickness ranging from 20 μm to 80 μm.

4. The photonic crystal microscope of claim 1, wherein the photonic crystal membrane has a Young's modulus ranging from 0.5 kPa to 100 kPa.

5. The photonic crystal microscope of claim 1, wherein the photonic crystal membrane has a photonic bandgap range from 430 nm to 700 nm.

6. The photonic crystal microscope of claim 1, wherein the photonic crystal microscope further comprises an objective lens disposed between the stage and the probe light source.

7. The photonic crystal microscope of claim 2, wherein the photonic crystal microscope further comprises an objective lens disposed between the stage and the probe light source.

8. The photonic crystal microscope of claim 3, wherein the photonic crystal microscope further comprises an objective lens disposed between the stage and the probe light source.

9. The photonic crystal microscope of claim 4, wherein the photonic crystal microscope further comprises an objective lens disposed between the stage and the probe light source.

10. The photonic crystal microscope of claim 5, wherein the photonic crystal microscope further comprises an objective lens disposed between the stage and the probe light source.

11. The photonic crystal microscope of claim 6, wherein the objective lens has a numerical aperture ranging from 0.1 to 0.9, and/or a magnification power ranging from 1× to 100×.

12. The photonic crystal microscope of claim 1, wherein the imaging assembly comprises an optical filter and a photosensitive element, a path where the optical filter lies is located between the photosensitive element and the stage.

13. The photonic crystal microscope of claim 2, wherein the imaging assembly comprises an optical filter and a photosensitive element, a path where the optical filter lies is located between the photosensitive element and the stage.

14. The photonic crystal microscope of claim 3, wherein the imaging assembly comprises an optical filter and a photosensitive element, a path where the optical filter lies is located between the photosensitive element and the stage.

15. The photonic crystal microscope of claim 4, wherein the imaging assembly comprises an optical filter and a photosensitive element, a path where the optical filter lies is located between the photosensitive element and the stage.

16. The photonic crystal microscope of claim 5, wherein the imaging assembly comprises an optical filter and a photosensitive element, a path where the optical filter lies is located between the photosensitive element and the stage.

17. A method for measuring cellular forces, which uses the photonic crystal microscope of claim 1, the method comprising:
placing the photonic crystal substrate on the stage to observe deformation of the photonic crystal substrate under an action of a to-be-measured cell;
emitting, by the probe light source, probe light to the photonic crystal substrate;
receiving, by the imaging assembly, the light reflected from the photonic crystal substrate to perform imaging, whereby force information between the to-be-measured cell and the photonic crystal substrate is obtained via a resultant image.

* * * * *